United States Patent [19]
Fyles et al.

[11] Patent Number: 5,491,780
[45] Date of Patent: Feb. 13, 1996

[54] SYSTEM AND METHOD FOR EFFICIENT COMPUTER WORKSTATION SCREEN UPDATES

[75] Inventors: Anthony Fyles, Winchester; Andrew Key; Vincent Sethi, both of Southampton, all of England

[73] Assignee: International Business Machines Corporation, Armonk, N.Y.

[21] Appl. No.: 296,262

[22] Filed: Aug. 25, 1994

Related U.S. Application Data

[63] Continuation of Ser. No. 105,835, Aug. 12, 1993, abandoned.

[30] Foreign Application Priority Data

Sep. 15, 1992 [GB] United Kingdom .................. 9219468

[51] Int. Cl.⁶ .................................................... G06F 12/00
[52] U.S. Cl. .......................... 395/153; 395/161; 395/163
[58] Field of Search ................................... 395/155, 157, 395/158, 161, 153, 200, 163; 345/2, 119, 120

[56] References Cited

U.S. PATENT DOCUMENTS

| | | | |
|---|---|---|---|
| 5,043,919 | 8/1991 | Callaway et al. | 395/157 |
| 5,134,697 | 7/1992 | Scheffler | 395/425 X |
| 5,157,763 | 10/1992 | Peters et al. | 395/161 X |
| 5,228,122 | 7/1993 | Cahn et al. | 395/155 |
| 5,241,625 | 8/1993 | Epard et al. | 395/163 |

FOREIGN PATENT DOCUMENTS 9201281  1/1992  WIPO.

*Primary Examiner*—Heather R. Herndon
*Assistant Examiner*—Cliff N. Vo
*Attorney, Agent, or Firm*—Robert M. Carwell

[57] ABSTRACT

A local computer 132 is connected to a remote computer 136 over a network for collaborative processing, whereby changes to the screen of the local computer are to be reflected on the screen of the remote computer. A hook routine 110 is used to intercept requests to update the screen of the local computer, and the area of the screen to be updated is determined from the request. Another routine then obtains the bit map for the area of the screen which has been updated, and only this bit map is transmitted to the remote computer, rather than one corresponding to the whole screen.

11 Claims, 3 Drawing Sheets

SYSTEM AND METHOD FOR EFFICIENT COMPUTER WORKSTATION SCREEN UPDATES

This is a continuation of application Ser. No. 08/105,835 filed Aug. 12, 1993, now abandoned.

TECHNICAL FIELD

This invention relates to networked computer systems and, more particularly, to user interface aspects of such systems.

BACKGROUND OF THE INVENTION

Over the last few years it has become increasingly common to connect personal computers or workstations together into networks so that different machines can communicate with one another. A typical approach has been the introduction of local area networks (LANs) that provide file transfer and other facilities between computers.

There is a continuing need to achieve more natural and effective communications between users—for example, to enable collaborative working, in which users of two or more different machines work simultaneously and in combination on a single application (for example a spreadsheet). This application will be running on just one of the machines, but its output will be displayed at the other workstations, so that multiple users can interact with the application.

A central aspect of collaborative working and other similar environments is the need for any modifications to the application display (for example a change in a graph) to appear as near simultaneously on all screens as possible. Too large a delay in displaying such modifications on remote terminals removes the spontaneity of collaborative working, and so loses most of the benefits. A major problem in achieving this simultaneity between workstations is that the connections between the computers have a limited bandwidth. This is particularly so if telephone-based ISDN lines or similar are used. One way of coping with this is to use data compression, to reduce the amount of data that must be transmitted. However, data compression is expensive in processing time, so that although time is saved in transmission, a delay is introduced by the compression itself.

Accordingly, the invention provides a computer workstation adapted for connection into a network of one or more other computers, the computer workstation including a screen, means for sending requests to the screen to update the contents of portions thereof, and means for transmitting the contents of the screen to other computers in the network, and characterized by means, responsive to said requests, for identifying the portion of the screen to be updated by a request, and means for selecting the contents of the portion of the screen updated by the request to be transmitted to another computer.

SUMMARY OF THE INVENTION

The invention is based on the need in collaborative or cooperative processing environments to allow updates to the screen of a local computer to be shared or mirrored as quickly as possible on the screens of one or more remote terminals connected to the local computer via some form of network. Rather than having to transmit the whole contents of the screen, only those areas of the screen that have been modified are transmitted, resulting in much quicker updating of the remote screens.

In a preferred embodiment, the computer workstation further includes means for storing a list of the updated portions of the screen, means for deleting a portion from the list when its contents have been transmitted, means for detecting overlap if any part of the screen is updated twice prior to transmission, and means for modifying the list of stored portions to avoid duplication. Thus if the same area of the screen is repeatedly updated, as would happen for example if a window was slowly dragged from one location to another, then the list still only contains a single reference to each modified area. This avoids having to repeatedly send the same area of the screen, even although it may have been updated several times. Note that the store only contains a list of the updated portions of the screen. The actual contents of the updated portions are not stored, since they may well be updated again before transmission.

In a preferred embodiment each identified portion of the screen is represented by a rectangle, and it is then the contents of this rectangle that is transmitted to the other computers in the network. The use of a rectangle is computationally very simple, and turns out to correspond to a large majority of updates. In a few cases the update has a more complicated shape, so that possibly a large proportion of the rectangle transmitted has not been updated. This could be avoided by using other shapes, perhaps based on more sophisticated calculations to determine very accurately the updated area of the screen for transmission. However, in general the savings in transmission time would not compensate for the increased processing time required for the extra shape calculations.

In the OS/2 operating system (or similar) the means for sending requests to the screen includes a graphics engine and a display presentation driver. The means for identifying the portion of the screen to be updated by a request preferably comprises a hook for intercepting calls from the graphics engine to the display presentation driver. By locating the hook as low as possible in the hierarchy of the graphical subsystem, the intercepted requests are relatively simple and can be processed quickly.

The invention further provides a method whereby the screen contents of a computer workstation in a network are transmitted to one or more other computers in the network, comprising the steps of:

sending requests to the screen of said computer workstation to update the contents of portions thereof;

identifying the portion of the screen to be updated by a request;

selecting the contents of the portion of the screen updated by the request; and transmitting the selected contents of the screen that have been updated to other computers in the network.

An embodiment of the invention will now be described by way of example with reference to the following drawings:

DETAILED DESCRIPTION OF THE PREFERRED EMBODIMENT

Figure 1:
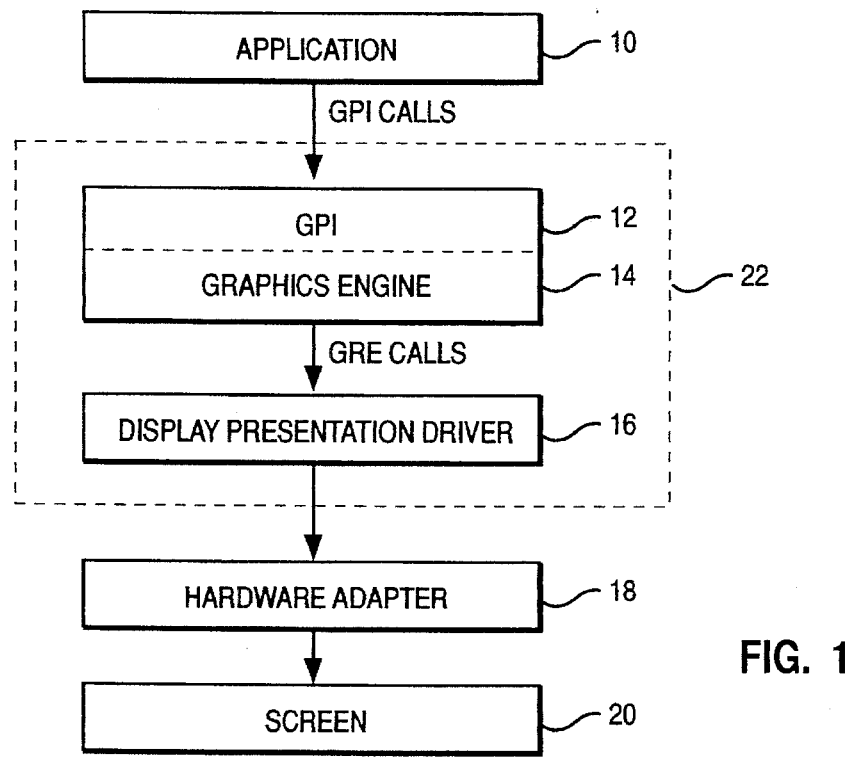
FIG. 1 illustrates the structure of a graphics subsystem in a typical computer.

FIG. 1 illustrates the structure of the graphics subsystem 22 of a computer workstation running the OS/2 Operating System in conjunction with the Presentation Manager (PM) graphical user interface (the invention is also applicable to many other operating systems such as Microsoft Windows, UNIX, and the like). At the top is the application 10, typically a spreadsheet, word processor, or drawing package, which is responsible for determining the output to appear on the screen 20. The application controls the screen via the graphical programming interface (GPI) 12, which provides a series of function calls (GPI calls) by which the application can request that boxes, lines, and so on are drawn on the screen. The GPI is effectively the top layer of a dynamic link library known as the graphics engine 14, which translates the GPI calls first into graphics orders, and then into lower level calls (known as GRE calls) for another dynamic link library, the display presentation driver 16. The display presentation driver in turn outputs commands to a hardware adapter 18 which directly controls the screen.

The use of a layered arrangement such as shown in FIG. 1 has the advantage that the GPI is device-independent, so that the application does not need to know details about the physical characteristics of the screen. Instead, this is primarily the responsibility of the display presentation driver, which must be modified according to the supported output device. Thus each type of output device must have its own display presentation driver. The operating system already includes such drivers for the more common types of output device, but for rarer ones the user must write their own driver (or it can be supplied with the output device). Further information about OS/2, PM and the GPI is available in many books: eg OS/2 Presentation Manager Programming by Cheatham, Reich and Robinson, Wiley, 1990; Programming the OS/2 Presentation Manager, by Petzold, Microsoft Press, 1989; and OS/2 Presentation Manager GPI, by Winn, van Nostrand Reinhold, 1991. Details about the GRE calls can be found in OS/2 Version 1.2 I/O Subsystems and Device Support: Volume 2 Presentation Driver Interfaces (document 64F0283, available from IBM).

Figure 2:
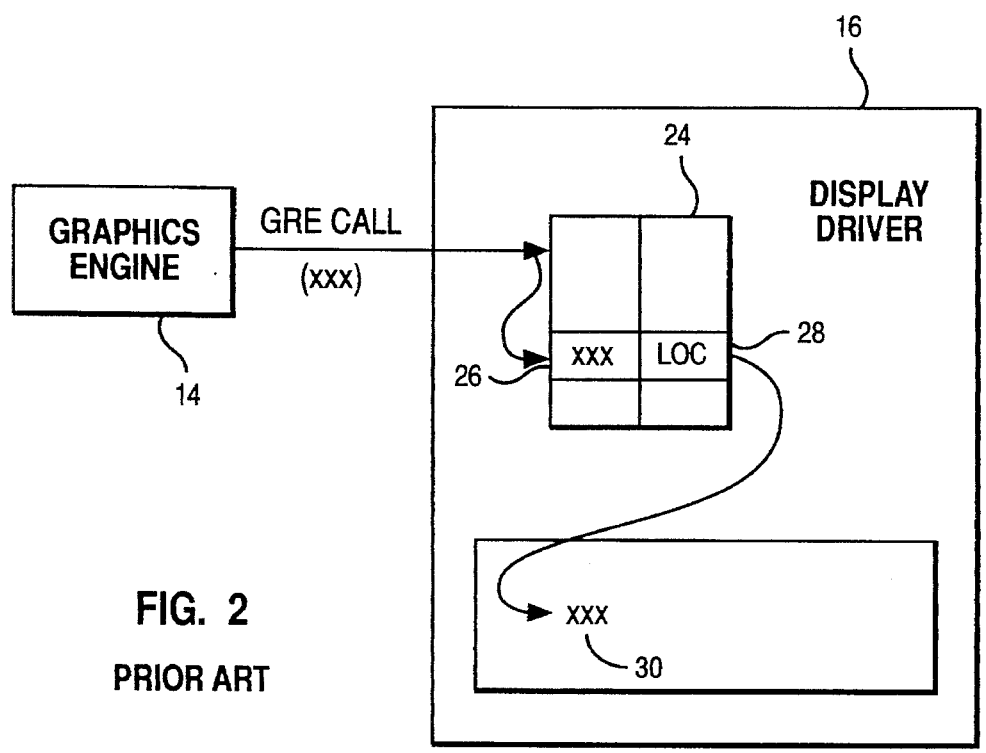
FIG. 2 illustrates the interaction of the graphics engine and presentation driver of FIG. 1 in more detail.

FIG. 2 shows the action of the graphics engine and the display driver according to the prior art. The display driver maintains a vector table 24 containing the entry points for all the routines in its link library. When a GRE call is made (denoted "XXX" in FIG. 2), the display driver references this table and finds the name of the called routine 26. Associated with the name is a pointer ("LOC") 28 to the entrypoint of the corresponding called routine 30, which can then be invoked.

Figure 3:
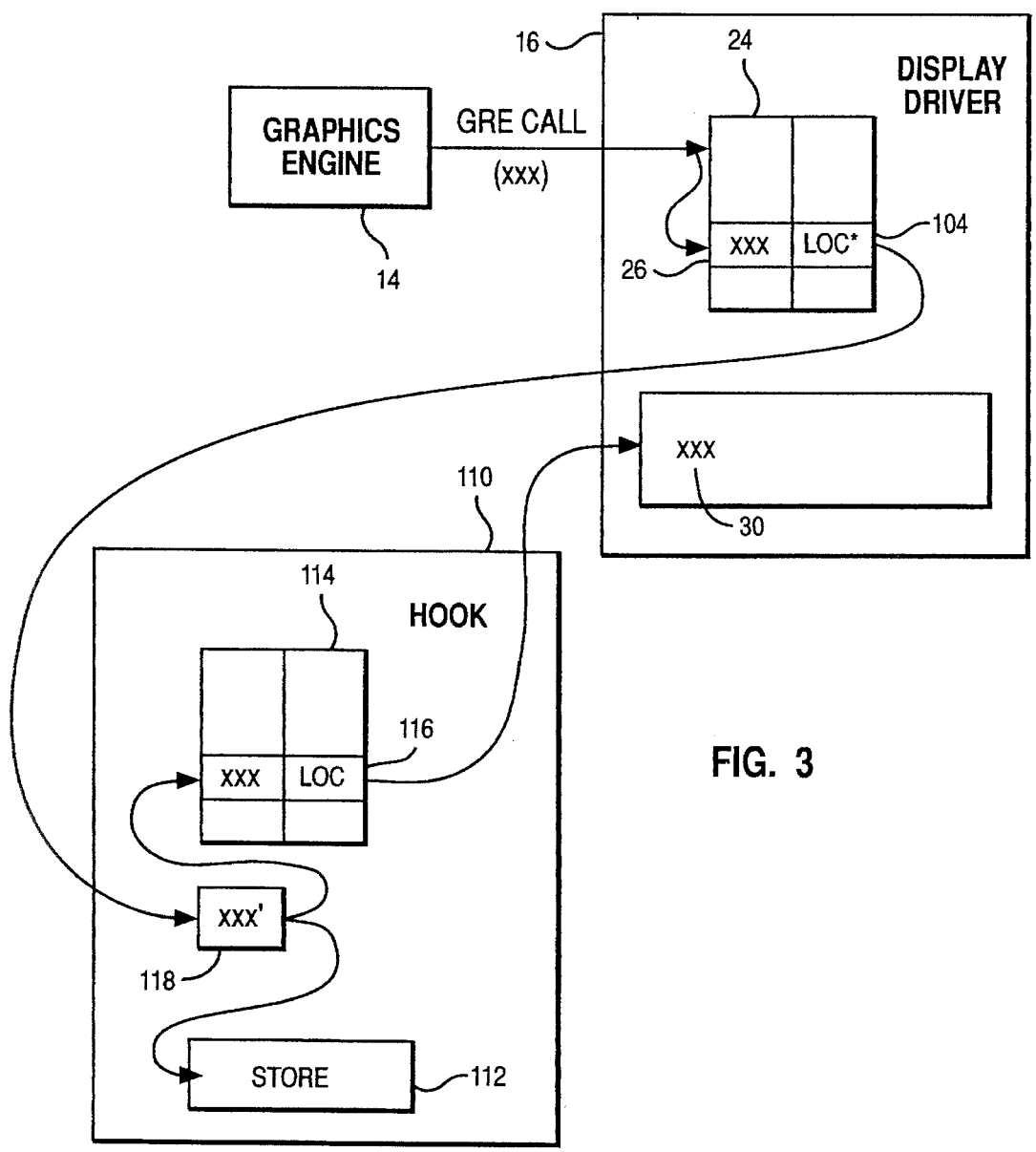
FIG. 3 illustrates a modification to the graphics subsystem in accordance with the present invention.

The vector table is modified according to the invention by the use of a hook 110, as shown in FIG. 3. The hook maintains a copy of the original vector table 114, whilst the entries in the display driver's vector table 24 are changed to point to routines in the hook, instead of the entrypoint locations. Since the only routines of interest are those that update the screen, these are the only entries in the display driver's vector table that are actually modified. The remainder, such as queries of current screen values, are not changed, and so these routines operate as before.

Likewise, the vector table in the hook only needs entries for the modified routines, although in practice it is often simpler to copy the whole vector table from the display driver.

Figure 4:
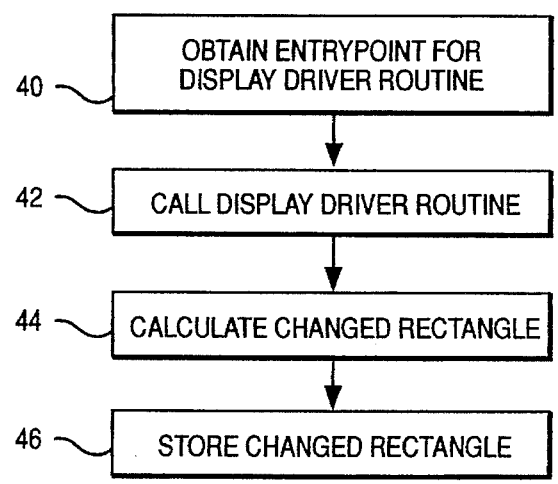
FIG. 4 illustrates the processing performed by one thread of the hook of FIG. 3.
Figure 5A:
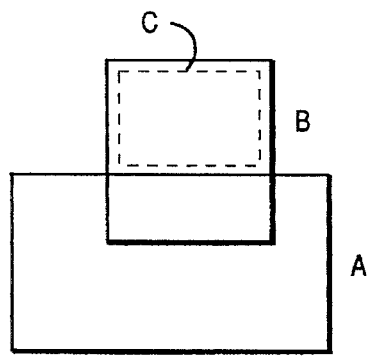
FIGS. 5A–5D illustrate how rectangles are stored.
Figure 5B:
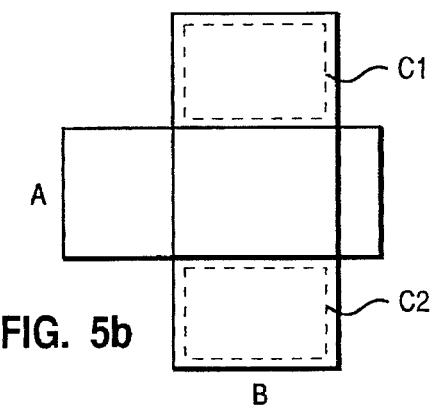
Figure 5C:
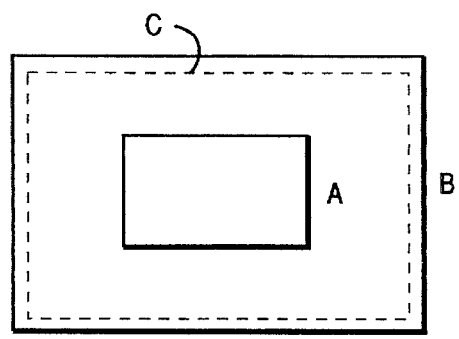
Figure 5D:
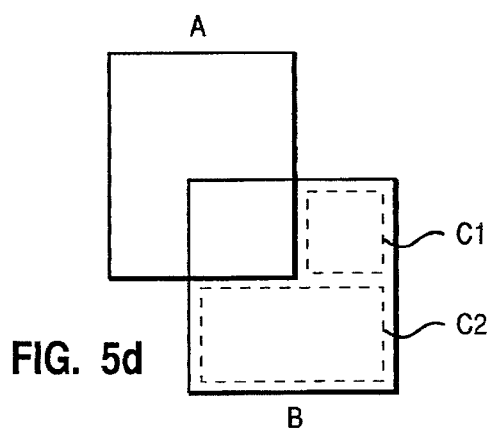
Figure 6:
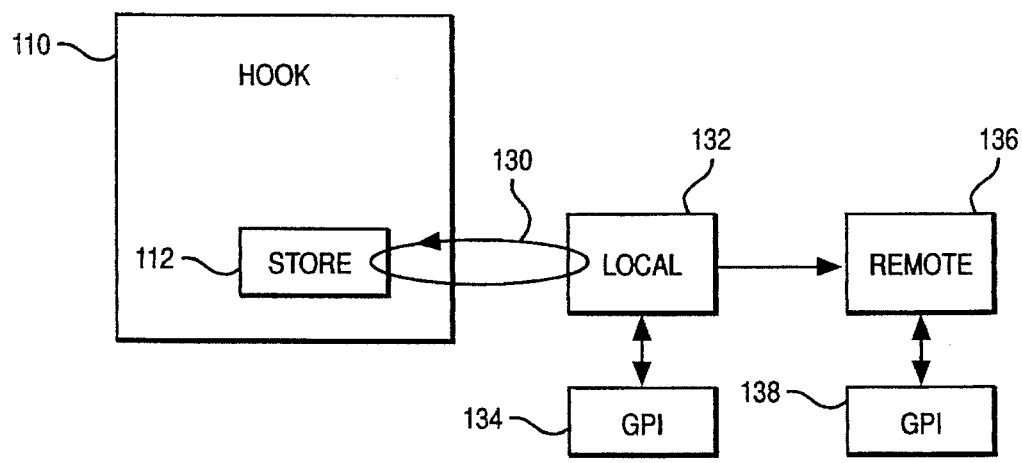
FIG. 6 illustrates how information about updated regions of the screen is transmitted to a remote terminal.

When a routine is called ("XXX" again), the display driver vector table is examined first as before. If this routine does not update the screen, then the routine is accessed in the display driver as in the prior art arrangement of FIG. 2 (note that OS/2 supports multiple bitmaps, known as device contexts, of which only one is associated with the screen, so that it is also necessary to filter out those calls which write to non-screen bit maps—for example, one can see if the bit map has its bottom left hand corner at the origin). However, assuming that "XXX" does update the screen, then the pointer associated with it ("LOC*") 104 now points not to the entrypoint in the display driver, but rather to a corresponding routine ("XXX'") 118 in the hook. The action of this hook routine (or thread) is illustrated in FIG. 4. The routine first (box 40) references the vector table 114 in the hook to determine the entrypoint ("LOC") 116 in the display driver of the routine 30 which was actually called by the application. This display driver routine is then invoked 42, to ensure that the correct action on the screen occurs. In doing so however, the hook also notes information from the parameters in the call, which are used to determine the area of the screen the call has updated 44. For simplicity, each updated area is represented by one or more rectangles. Since most calls (in terms of calling frequency) are based on rectangles, eg deleting or coloring rectangles, or "bit-bits" (copying a block of bits), on most occasions the updated area of the screen can be simply and accurately represented by rectangles. For those calls which are not based on rectangles, such as drawing a polyline, it is much more difficult to directly determine the area affected, so in this case a bounding rectangle for the update is calculated. Finally, for some calls, such as drawing arcs on the screen, even calculating a bounding rectangle is troublesome, in which case the rectangle corresponding to the whole of the window is used.

The hook maintains a list 112 of rectangles which have been updated by GRE calls. Only those parts of the rectangle which do not overlap earlier rectangles are stored 46. These parts are broken down into smaller rectangles if necessary. Several examples are shown in FIG. 5, in which rectangle "A" is a pre-existing rectangle (i.e. an already updated area), and "B" is a newly up-dated rectangle. The rectangles shown in dotted outline ("C", "C1", etc) are those actually added to the list (in FIG. 5c, rectangle A would be deleted from the list since it is wholly contained within rectangle C). Each new rectangle is tested against all pre-existing rectangles. In some cases the modified pixels in an update may be distributed in several very small rectangles, perhaps less than ten pixels each. In this case it may not be worth storing these as separate small rectangles for individual transmission, but rather it is more efficient to ignore the overlap and transmit the update as a single rectangle, even if this does result in some pixels being sent twice (a typical example of when this might occur is moving a window).

The hook further contains a thread 130 which loops round taking a rectangle at a time from the list 112 (the rectangle is deleted from the list once taken). The order in which the thread removes rectangles can be based on time (taking the oldest or newest rectangle), size (for example the largest rectangle), or any other appropriate strategy. Likewise, the thread can operate at regular time intervals, or when prompted by the arrival of a new update, although a continuous loop is preferred. The thread obtains the current screen contents for the rectangle using the GPI interface 134, and transmits them to one or more remote terminals 136. To obtain the screen contents, the thread first uses a bit-blt to copy the rectangle from the screen into a separate bit map (having the same size as the rectangle), and then calls the Gpi_QueryBitMapBits routine to obtain the actual pixel values. The rectangle is copied into a separate bit map, because Gpi_QueryBitMapBits works more quickly if a whole bit map is being addressed, rather than just a portion of the screen.

The transmitted rectangle is received at a remote terminal by a thread running on the remote terminal. This calls Gpi_SetBitMapBits to write the received rectangle into a bit map, which is then copied to the screen using a bit-blt (again, the rectangle is not written directly onto the screen for performance reasons), to allow changes on the first (local) screen 132 to be quickly and accurately reflected at the second (remote) terminal 136. It is easy for the network to include workstations running different operating systems because the screen update is sent in the form of a bit map.

The store 112 associated with the hook contains only the identity of the updated regions of the screens, rather than the updated values themselves. Adopting the latter approach would require copying the screen values for each update, and would impact the display performance of the local screen. It would furthermore be wasteful in that areas of the screen updated more than once would have to be repeatedly copied into the hook store. By comparison, the technique described only copies the updated screen contents when they are about to be sent. The result of this of course is that the remote terminals never receive the intervening updates, so that their screens do not show the intermediate states—i.e. from the updates prior to the update actually transmitted. However, the missed updates are normally of little importance (typically they might represent intermediate positions as a window is dragged across the screen).

It is also possible for an update to be transmitted twice, when a particular area is already designated as updated, and gets further updated inbetween the hook thread 130 reading the relevant rectangle from the store 112, and obtaining the corresponding screen contents using a GPI call. This results in a rectangle for the later update being added to store despite the contents of the update already having been transmitted. The only consequence of this is that the update will be re-transmitted when the hook thread 130 reads the stored rectangle from the later update. This duplication is clearly inefficient, but in practice the resulting loss of performance is completely insignificant.

The approach of using only rectangles to identify updated areas of the screen is somewhat inefficient for those cases in which only a bounding rectangle is determined, in that the whole bounding rectangle will be transmitted to the remote workstations despite only a fraction of the rectangle actually having been updated. Clearly, this inefficiency in terms of unmodified areas being transmitted is likely to be greater if the whole window has to be transmitted. Nevertheless, it has been found that about 90% of operations are bit-blts or other rectangle-based calls. Approximately another 9% of calls are such as to allow a bounding rectangle to be calculated, and only very rarely does the whole window have to be transmitted. Thus the use of rectangles has the advantage of allowing rapid calculation and is exact in many cases, whilst it is only inefficient in a relatively small number of cases.

It should be noted that in theory it would be possible to place the hook on the graphics engine rather than the display presentation driver, intercepting the GPI calls rather than the GRE calls. The difficulty with this is that it is slower, and also it is much less easy to determine which area of the screen has been updated (since the GPI calls can be relatively complicated). Nevertheless, future increases in processing speed may render this a more plausible option.

A rather different update strategy would be to transmit the update requests themselves to other computers in the network, allowing these remote terminals to process them in the same way as the local computer. The problem with this is that the computers in the network may be running different operating systems, or are likely to have different forms of screen hardware attached which do not all share the same behavior. For example, if the display driver does not understand a command from the graphics engine (typically because that command has not been implemented for that display driver), it can send a message to the graphics engine requesting that it repeat the command, but broken down into simpler drawing instructions. Complications such as these generally prevent the simple transmission of GRE (or GPI) calls to remote terminals, although the strategy can be employed in networks running certain operating systems, in particular the Apple System 7, and usually having identical hardware throughout.

We claim:

1. An improved subsystem for a computer workstation adapted for connection into a network of one or more other computers, said computer workstation including a screen, means for sending requests to the screen to update the contents of portions thereof, and means for transmitting the contents of said portions to other computers in the network, said improvement comprising:

means, responsive to said requests, for identifying said portions of the screen for updating by said requests;

means for selecting updated contents corresponding to said portions for transmissions to another computer;

means for generating a list of entries, each corresponding to one of said portions;

means for detecting if any of said portions of said screen has been updated a first time and a second time between said transmissions; and means for deleting from said list, upon said detecting, one of said entries corresponding to one of said portions updated said first time and overlapped by said one of said portions updated said second time.

2. The subsystem of claim 1, further comprising means for storing a list of said portions of said screen after said updating, and means for deleting one of said portions from said list of said portions when said contents of said portions have been transmitted.

3. The subsystem of claim 2 wherein each of said identified portions of the screen is represented by a rectangle.

4. The subsystem of claim 3, wherein said means for sending requests to the screen includes a graphics engine and a display presentation driver, and further wherein said means for identifying said portions of the screen for updating by said requests comprises a hook for intercepting calls from the graphics engine to the display presentation driver.

5. The subsystem of claim 4, wherein said hook contains a copy of B vector table listing entry-points of routines in the display presentation driver.

6. For use with a computer workstation having a screen, contents of said screen to be transmitted to one or more other computers in a network, portions of said screen to be updated, and corresponding contents of said portions, a method for transmitting said contents of said screen, comprising:

sending requests to said screen of said computer workstation to update said contents of said portions thereof;

identifying said portions of the screen to be updated by a request;

selecting said contents of said portions of said screen updated by said request;

transmitting said selected contents of said portions of said screen updated by said request to said other computers in said network;

generating a list of entries, each corresponding to one of said portions;

detecting overlap if any of said portions of said screen has been updated a first time and a second time between sequential said transmitting; and deleting from said list, upon said detecting, one of said entries corresponding to one of said portions updated said first time.

7. The method of claim 6, further comprising the steps of storing in said list indications of said portions of said screen updated by said request, and deleting one of said indications from said list when said selected contents of said portions have been transmitted.

8. A method for use in network computer systems for efficiently updating a remote user interface screen from a local user interface screen, comprising:

generating a list of updated portions of said local screen;

detecting overlap if part of said local screen is updated a first time and a second time prior to transmission of data corresponding to said local screen to said remote screen;

deleting from said list, in response to said detecting, an entry corresponding to a portion of said local screen updated said first time and prior to said transmission.

9. The method of claim 8 further including storing said list.

10. The method of claim 8 further including inhibiting transmission of intervening updates to said remote screen between each said transmission of data.

11. A method of managing user interface screens in a network of at least a first and second computer interconnected by said network comprising:

generating a window at a first location on a first of said screens of said first computer including a preselected screen area;

generating a first transmission onto said network of data contents of said window at said first location;

receiving said first transmission by said second computer;

moving said window from said first location to a second location wherein said window at said second location includes a portion partially overlapping said window at said first location;

repeatedly modifying said first of said screens during said moving;

generating a second transmission onto said network of data contents of said window at said second location;

receiving said second transmission by said second computer;

generating a list including entries corresponding to said area;

editing said list during said moving to contain a single reference to said area at said second transmission which excludes said portion partially overlapping said window at said first location; and updating a second of said screens of said second computer disposed remotely of said first computer in response to said receiving said second transmission by said second computer.

* * * * *